(12) United States Patent
Anderson et al.

(10) Patent No.: US 7,690,174 B2
(45) Date of Patent: Apr. 6, 2010

(54) COMPRESSING AND CONVEYING ARTICLE THROUGH SHRINK PACKAGING MACHINE

(75) Inventors: Richard Anderson, Massillon, OH (US); Jeff Bockus, Louisville, OH (US); Timothy Wilkinson, Ashland, OH (US)

(73) Assignee: KPC-Master's Craft International, Inc., Massillon, OH (US)

( * ) Notice: Subject to any disclaimer, the term of this patent is extended or adjusted under 35 U.S.C. 154(b) by 83 days.

(21) Appl. No.: 11/946,030

(22) Filed: Nov. 27, 2007

(65) Prior Publication Data

US 2008/0128246 A1   Jun. 5, 2008

Related U.S. Application Data

(60) Provisional application No. 60/867,351, filed on Nov. 27, 2006.

(51) Int. Cl.
*B65B 1/24* (2006.01)
*B65B 51/10* (2006.01)

(52) U.S. Cl. .............................. 53/439; 53/463; 53/530; 53/557

(58) Field of Classification Search .................. 53/436, 53/411, 439, 463, 113, 528, 530, 557; 198/606, 198/608, 312, 326.5, 779
See application file for complete search history.

(56) References Cited

U.S. PATENT DOCUMENTS

| | | | | |
|---|---|---|---|---|
| 1,406,228 A | * | 2/1922 | Riedel | 193/35 R |
| 2,338,074 A | * | 12/1943 | Cornwell | 53/411 |
| 2,525,651 A | | 10/1950 | Clunan | |
| 2,827,153 A | * | 3/1958 | Olk et al. | 198/790 |
| 3,312,811 A | * | 4/1967 | Shanklin | 219/388 |
| 3,340,670 A | | 9/1967 | Anderson et al. | |
| 3,357,153 A | * | 12/1967 | Shaffer | 53/442 |
| 3,616,548 A | * | 11/1971 | Nichols | 34/233 |
| 3,675,760 A | * | 7/1972 | Burrage et al. | 198/779 |
| 3,727,324 A | * | 4/1973 | Melgaard | 34/216 |

(Continued)

OTHER PUBLICATIONS

IDS Letter Submitted Mar. 7, 2008, including Exhibit A ("Asset Purchase Agreement"), Exhibit B ("Photographs 1-5"), Exhibit C ("Employment Agreement"), Exhibit D ("Richard Anderson Declaration"), and Exhibit E ("*Micro-Magnetic Industries, Inc.* v. *Advance Automatic Sales Co., Inc.*").

*Primary Examiner*—Paul R Durand
(74) *Attorney, Agent, or Firm*—Tillman Wright, PLLC; Chad D. Tillman; Jeremy C. Doerre

(57) ABSTRACT

An apparatus for conveying an article through a hot air chamber of a shrink packaging machine comprises a first conveyor and a second conveyor. Each conveyor includes a plurality of rollers. The rollers of the plurality are interconnected together to form an endless conveyor belt. The conveyor further includes a drive assembly for advancing the endless conveyor belt in a first direction, and a track member having a surface disposed in engagement with particular rollers of the endless conveyor belt. Each of the particular rollers of the endless conveyor belt rolls over the surface of the track member when advanced through the shrink packaging machine. The first conveyor is located over the second conveyor in opposing facing relation therewith such that a compressible item to be shrink wrapped may be compressed and conveyed through the shrink packaging machine between and by the first and second conveyors.

20 Claims, 13 Drawing Sheets

U.S. PATENT DOCUMENTS

| | | | |
|---|---|---|---|
| 3,760,154 A * | 9/1973 | Konger | 219/388 |
| 3,848,398 A * | 11/1974 | Suhr | 53/530 |
| 4,592,193 A * | 6/1986 | Gustavsson | 53/530 |
| 4,731,250 A * | 3/1988 | Stark | 426/234 |
| 4,738,078 A * | 4/1988 | Benz et al. | 53/439 |
| 4,989,397 A * | 2/1991 | Tomac et al. | 53/528 |
| 5,009,057 A * | 4/1991 | Wilkinson | 53/439 |
| 5,189,864 A * | 3/1993 | Cinotti et al. | 53/439 |
| 5,339,605 A * | 8/1994 | Simpson et al. | 53/439 |
| 5,759,146 A | 6/1998 | Wilkinson | |
| 5,797,247 A * | 8/1998 | Nakagoshi et al. | 53/442 |
| 5,979,145 A * | 11/1999 | Louis et al. | 53/439 |
| 6,010,003 A | 1/2000 | Wilkinson | |
| 6,158,199 A * | 12/2000 | Emery et al. | 53/442 |
| 6,318,053 B1 * | 11/2001 | Frank et al. | 53/586 |
| 7,380,653 B2 * | 6/2008 | Anderson et al. | 198/782 |

* cited by examiner

COMPRESSING AND CONVEYING ARTICLE THROUGH SHRINK PACKAGING MACHINE

CROSS-REFERENCE TO RELATED APPLICATION

The present application is a U.S. nonprovisional patent application of, and claims priority under 35 U.S.C. § 119(e) to, U.S. provisional patent application Ser. No. 60/867,351, filed Nov. 27, 2006, which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention relates generally to shrink packaging machines and, in particular, to shrink packaging machines for shrink wrapping articles wherein the articles are compressed during the shrink wrapping process.

In shrink wrapping articles, it is common to entirely encase each article, including top and bottom, with a shrink film, such as polyvinyl chloride or polypropylene soft shrink material, and then transport the article covered in shrink film on a mesh conveyor belt through a shrink tunnel. Many times a compressible article has a height that is more than the height allowance of the shrink tunnel through which the article is conveyed. Consequently, such article will need to be compressed in order to fit through the shrink tunnel.

Additionally, and perhaps more importantly, compressing articles during shrink wrapping is valuable in that the resulting shrink wrapped article consumes less space during shipment, during storage in warehouses, and during display on retail shelves. For instance, significant value can be achieved by compressing and shrink wrapping sweatshirts, blankets, pillows, or bedspreads for distribution and sale.

One approach utilizes shrink tunnels having hot air chambers and mesh belt conveyors, wherein a "mesh belt conveyor" is considered to be a conveyor having a belt comprising a mesh material. In this approach, a bottom mesh belt conveyor and a top mesh belt conveyor are synchronized to travel in the same direction at the same speed through a hot air chamber of the shrink tunnel. As the article travels through the tunnel, the top conveyor and bottom conveyor compress the article. Typically, hot air is heated to between 150° Fahrenheit and 600° Fahrenheit and, while the article is conveyed through the hot air chamber, the hot air is blown onto the shrink film between the openings in the mesh material. The hot air blown thereby shrinks the shrink film about the article. While this method is effective for compressing and shrink wrapping the article, the method tends to leave an undesirable mesh pattern in the shrink film surrounding the article. The pattern results because portions of the film that are in contact with the mesh belt conveyor are restrained from shrinking at the same rate as the film that is not in contact with, and thus not restrained by, the mesh belt conveyors.

Another approach includes an arrangement of opposed bottom and top solid belt conveyors synchronized to travel in the same direction through a shrink tunnel at the same speed. Similar to the foregoing approach, as the article travels through the shrink tunnel, the top conveyor and the bottom conveyor compress the article. The shrink packaging in this approach, however, occurs through the direct heating of the belts, rather than the circulation of heated air through openings in a mesh material as described above. Unfortunately, the pressure that the solid belts exert on the article to compress it also inhibits free movement of the shrinking film, which is necessary in order for the film to shrink properly.

Moreover, in the consumer retail context, a compressed and shrink wrapped package is normally not very presentable as a retail package for purchase by a consumer. The wrinkles in the film, visible tunnel belt pattern, and other detractions that normally result from the shrink packaging process serve as significant detractions to display and sale of the shrink wrapped product. High dollar items like bedspreads need to look appealing on retail display; therefore, the quality of the package matters. Accordingly, in order to accomplish the desired space savings while still having a presentable retail package, it is conventional to package the product in a retail package and then shrink wrap the retail package for the space savings during transport and storage. Then, once the shrink wrapped product arrives at the final destination for retail sale, the shrink wrapping is removed and product in its retail package is then put on display. In some cases, the retail package regains its original volume for display.

In view of the foregoing, improvements in shrink packaging are desirable. The present invention is believed to provide one or more such improvements.

SUMMARY OF THE INVENTION

The present invention includes many aspects and features.

In a first aspect of the invention, an apparatus for conveying an article through a hot air chamber of a shrink packaging machine comprises a first conveyor and a second conveyor. The first conveyor includes a first plurality of rollers with each roller of the first plurality of rollers including a shaft and a cylindrical member mounted on the shaft for rotation about an axis of the shaft. The shaft may rotate with the cylindrical member or, alternatively, may remain fixed with the cylindrical member rotating about the shaft. The rollers of the first plurality are interconnected together to form a first endless conveyor belt. The first conveyor further includes a first drive assembly for advancing the first endless conveyor belt in a first direction within a hot air chamber of a shrink packaging machine and a first track member extending within the hot air chamber of the shrink packaging machine and having a surface disposed in engagement with particular rollers of the first endless conveyor belt located within the hot air chamber of the shrink packaging machine. Each of the particular rollers of the first endless conveyor belt rolls over the surface of the first track member when advanced through the hot air chamber of the shrink packaging machine by the first drive assembly.

The second conveyor includes a second plurality of rollers with each roller thereof including a shaft and a cylindrical member mounted on the shaft for rotation about an axis of the shaft. The shaft may rotate with the cylindrical member or, alternatively, may remain fixed with the cylindrical member rotating about the shaft. The rollers of the second plurality are interconnected together to form a second endless conveyor belt. The second conveyor further includes a second drive assembly for advancing the second endless conveyor belt in the first direction within the hot air chamber of the shrink packaging machine and a second track member extending within the hot air chamber of the shrink packaging machine and having a surface disposed in engagement with particular rollers of the second endless conveyor belt located within the hot air chamber of the shrink packaging machine. Each of the particular rollers of the second endless conveyor belt rolls over the surface of the second track member when advanced through the hot air chamber of the shrink packaging machine by the second drive assembly. The first conveyor is located over the second conveyor in opposed facing relation therewith such that a compressible item to be shrink wrapped may be compressed and conveyed through the hot air chamber of the shrink packaging machine between and by the first and second conveyors. In this configuration, the first conveyor may be referred to as the top conveyor and the second conveyor may be referred to as the bottom conveyor.

In a feature of the first aspect, the first drive assembly and the second drive assembly include a common drive mechanism including a common motor for advancing the first and second endless conveyor belts in the first direction within the hot air chamber of the shrink packaging machine. In another feature, the first drive assembly comprises a first pair of drive chains, and the second drive assembly comprises a second pair of drive chains. With regard to this feature, each respective roller of the first plurality of rollers is attached to a different link in each of the first pair of drive chains, and each respective roller of the second plurality of rollers is attached to a different link in each of the second pair of drive chains.

In an additional feature, the first track member comprises one or more rails mounted to the shrink packaging machine and the first track member extends within the hot air chamber of the shrink packaging machine. The second track member comprises one or more rails mounted to the shrink packaging machine and the second track member extends within the hot air chamber of the shrink packaging machine. In yet another feature, the product of the respective angular velocity and the respective diameter of each roller of the first endless conveyor belt and the second endless conveyor belt is the same. In accordance with this feature, the diameter of each roller of both the first endless conveyor belt and the second endless conveyor belt may be the same.

In yet another feature, the apparatus further comprises a first pair of side support frames disposed on opposite longitudinal sides of the first endless conveyor belt. The side support frames support the first endless conveyor belt therebetween, with each of the first pair of side support frames including first and second sections connected together for selective disposition relative to each other about an infeed pivot axis, whereby an angle of infeed may be selectively adjusted for accommodating compressible articles having different heights by the shrink packaging machine.

In a second aspect of the invention, a method for conveying an article through a shrink packaging machine comprises transporting an article within the shrink packaging machine by engaging an article by and between two opposed conveyors and driving the opposed conveyors at approximately the same speed in a common direction through a shrink packaging machine. Each of the two conveyors comprises a plurality of parallel rollers disposed in side-by-side relation and interconnected together at the ends thereof, and the article is engaged by the surfaces of particular rollers of the two conveyors. Concurrently with this transporting of the article, the particular rollers having surfaces in engagement with the article are caused to rotate such that the article is propelled relative to the particular rollers.

In a feature of the second aspect, the article is further propelled by rotation of the particular rollers in the common direction through the shrink packaging machine. The article is thereby conveyed through the shrink packaging machine at a speed greater than the common speed of the two conveyors. In another feature, the step of causing the rollers having surfaces in engagement with the article to rotate comprises retaining the rollers of the conveyors in abutment with track members extending within and mounted in fixed disposition relative to the shrink packaging machine such that the driving of the conveyors results in the rolling of the rollers on the track members.

In an additional feature, the article comprises a shrink wrap film, and the rollers of each conveyor are disposed at predetermined distances relative to each other so as to provide openings through which the film is exposed to hot air within the shrink packaging machine for shrinking of the film. In yet another feature, the article is compressible, and the method further comprises compressing the compressible article between the opposed conveyors.

In a further feature, the step of compressing the article between the opposed conveyors includes disposing respective leading sections of the opposed conveyors in a converging orientation relative to one another and respective trailing sections of the opposed conveyors in parallel orientation relative to one another, whereby the compressible article is compressed during conveyance through the leading section of the opposed conveyors and is held in a compressed state during conveyance through the trailing section of the opposed conveyors. In still yet another feature, driving the opposed conveyors comprises driving the opposed conveyors with the same drive mechanism, which may include a common motor.

In a third aspect of the invention, a method for conveying an article within a hot air chamber of a shrink packaging machine comprises both carrying an article on an endless belt of a conveyor that is driven in a direction of travel of the article through a hot air chamber of the shrink packaging machine, with the conveyor comprising a plurality of parallel rollers disposed in side-by-side relation and interconnected together at the ends thereof, and with the article being engaged by the surfaces of the rollers of the conveyor; and concurrently rotating the rollers of the conveyor having surfaces in engagement with the article such that the article is further propelled in the direction of travel of the article through the hot air chamber of the shrink packaging machine. The article is thereby conveyed through the shrink packaging machine at a speed greater than a speed of the conveyor belt in the direction of travel of the article through the hot air chamber of the shrink packaging machine.

In addition to the aforementioned aspects and features of the present invention, it should be noted that the present invention further includes the various possible combinations of such aspects and features.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

Figure 1:
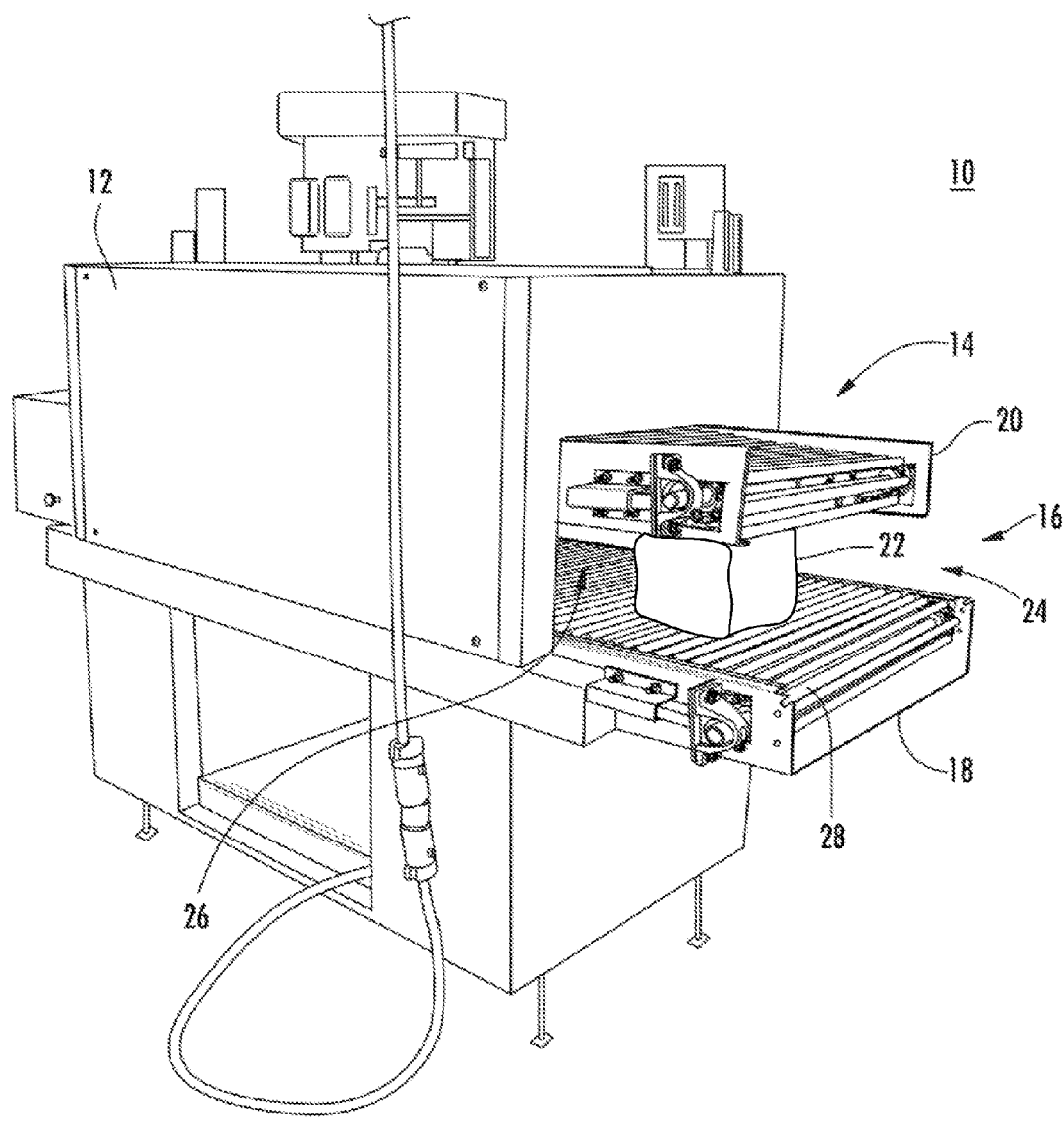
FIG. 1 is a perspective view of a shrink packaging machine including a pair of conveyors in accordance with a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein— as understood by the Ordinary Artisan based on the contextual use of such term— differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" As well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its application, or uses.

FIG. 1 is a perspective view of a shrink packaging machine 10 including an apparatus 16 having a pair of conveyors 18,20 in accordance with a preferred embodiment of the present invention. As with conventional shrink packaging machines, the shrink packaging machine 10 of FIG. 1 includes a housing 12 enclosing a shrink tunnel 14 having a hot air chamber (not shown).

Apparatus 16 includes both a bottom conveyor 18 and a top conveyor 20 synchronized to travel in the same direction through the tunnel 14 at the same speed. Furthermore, the conveyors 18,20 preferably are designed and intended to compress compressible articles 22 having a height greater than that of a vertical spacing 24 extending to and between the conveyors 18,20, thereby enabling the articles 22 to fit through the shrink tunnel 14. As such, the conveyors 18,20 extend a distance from an inlet 26 of the shrink tunnel 14 to allow the article 22 to be at least partially compressed during infeed and prior to entering the tunnel 14.

In accordance with the present invention, each conveyor 18,20 includes a plurality of parallel rollers 28 disposed in side-by-side relation and interconnected together at the ends thereof to define and form an endless conveyor belt. An article is engaged by surfaces of rollers of the two conveyors 18,20 as it travels through the shrink tunnel 14.

As an article 22 travels through the shrink tunnel 14, hot air from the hot air chamber is able to travel between a respective spacing between adjacent rollers 28 of the conveyors 18,20 to shrink film surrounding the article. Furthermore, no part of the surface of the rollers 28 remains in constant contact with the shrink film, thereby permitting the film to move as it shrinks despite the compressive forces of the conveyors 18,20 that are continuously maintained against the article 22.

Figure 2:
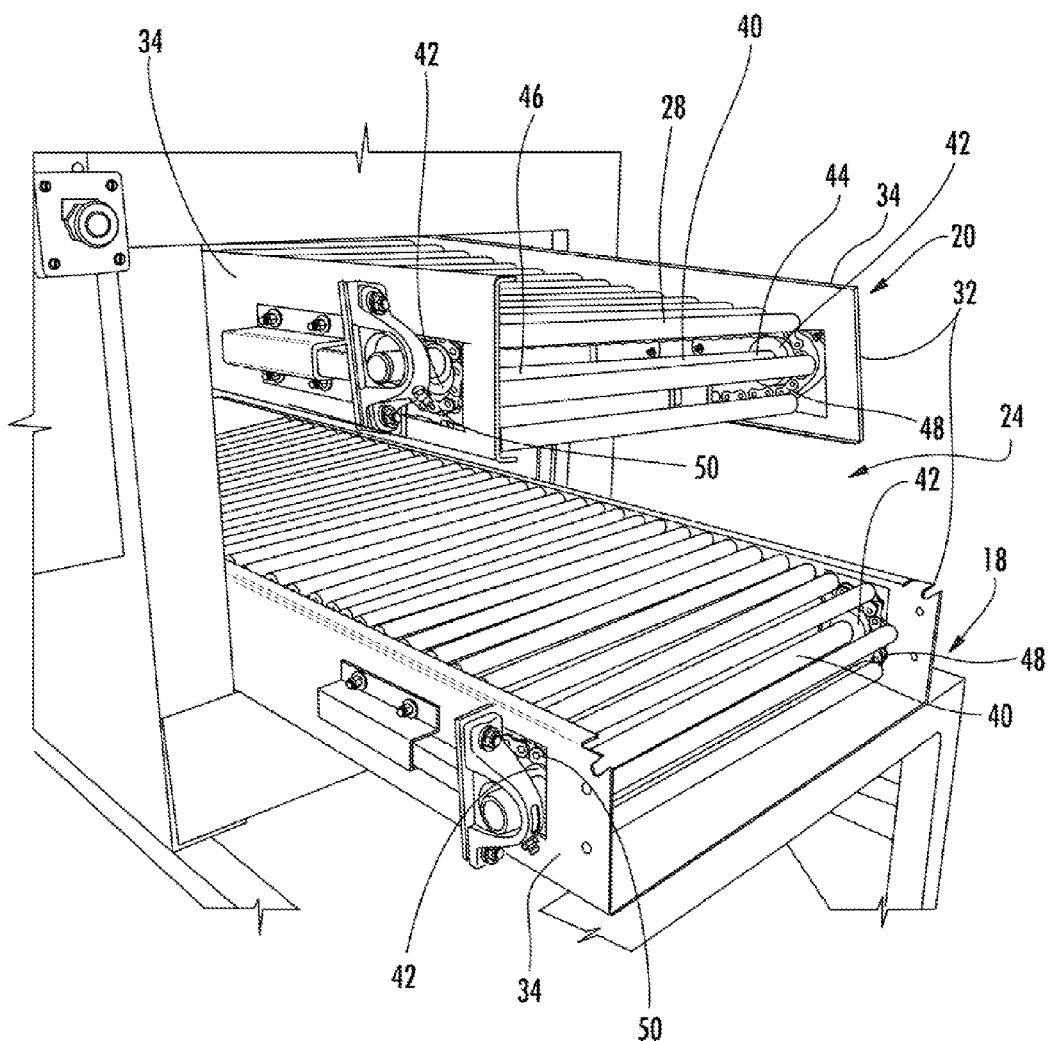
FIG. 2 is a front perspective view of a portion of the shrink packaging machine of FIG. 1, illustrating the conveyors thereof.
Figure 3:
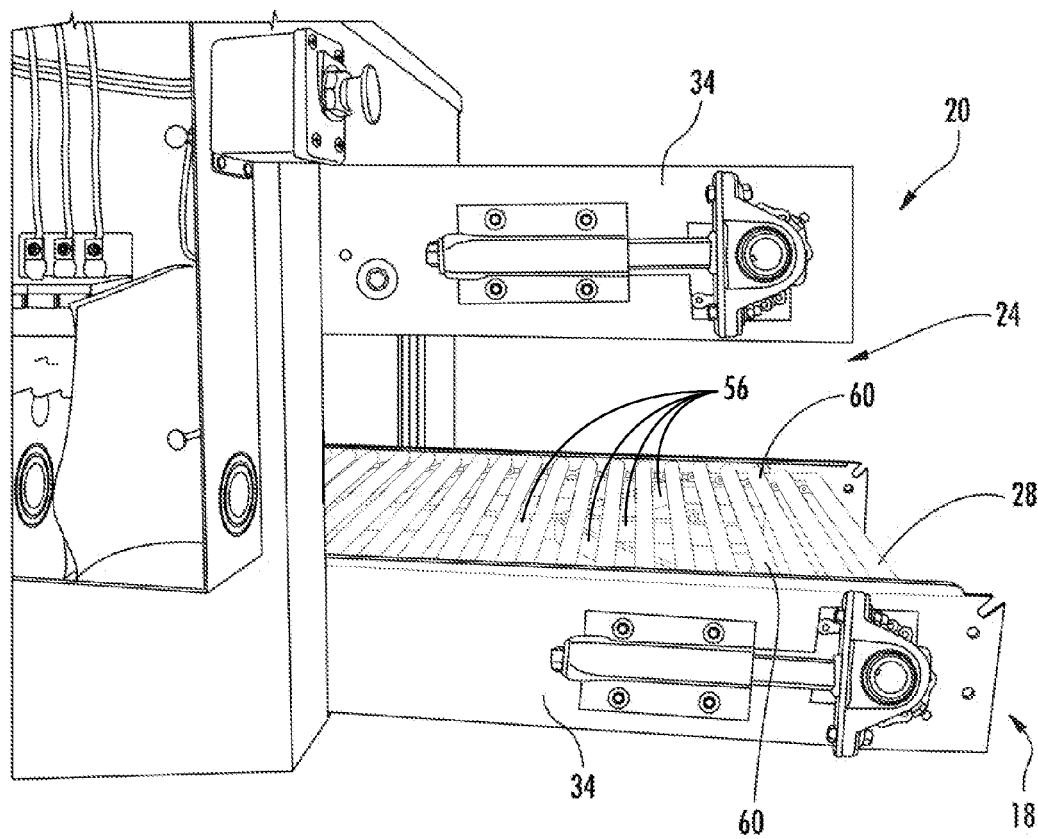
FIG. 3 is a side perspective view of a portion of the shrink packaging machine of FIG. 1, further illustrating the conveyors thereof.
Figure 4A:
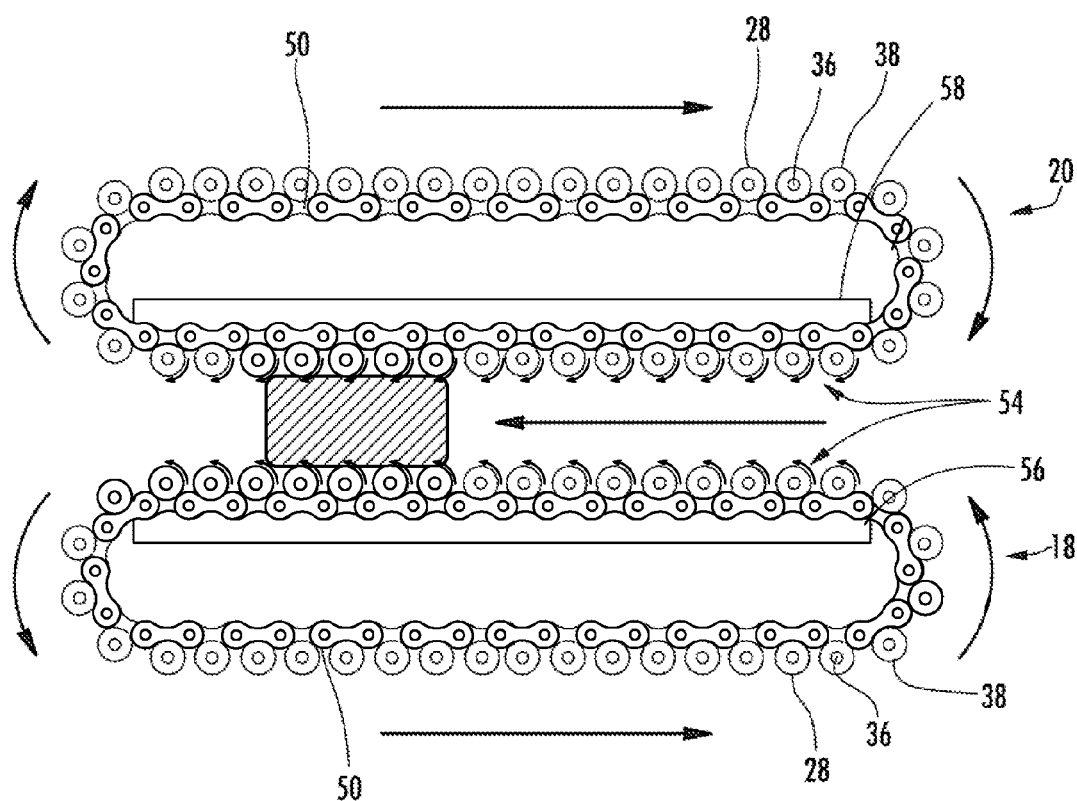
FIGS. 4A and 4B are schematic illustrations of the conveyors of FIG. 1.
Figure 4B:
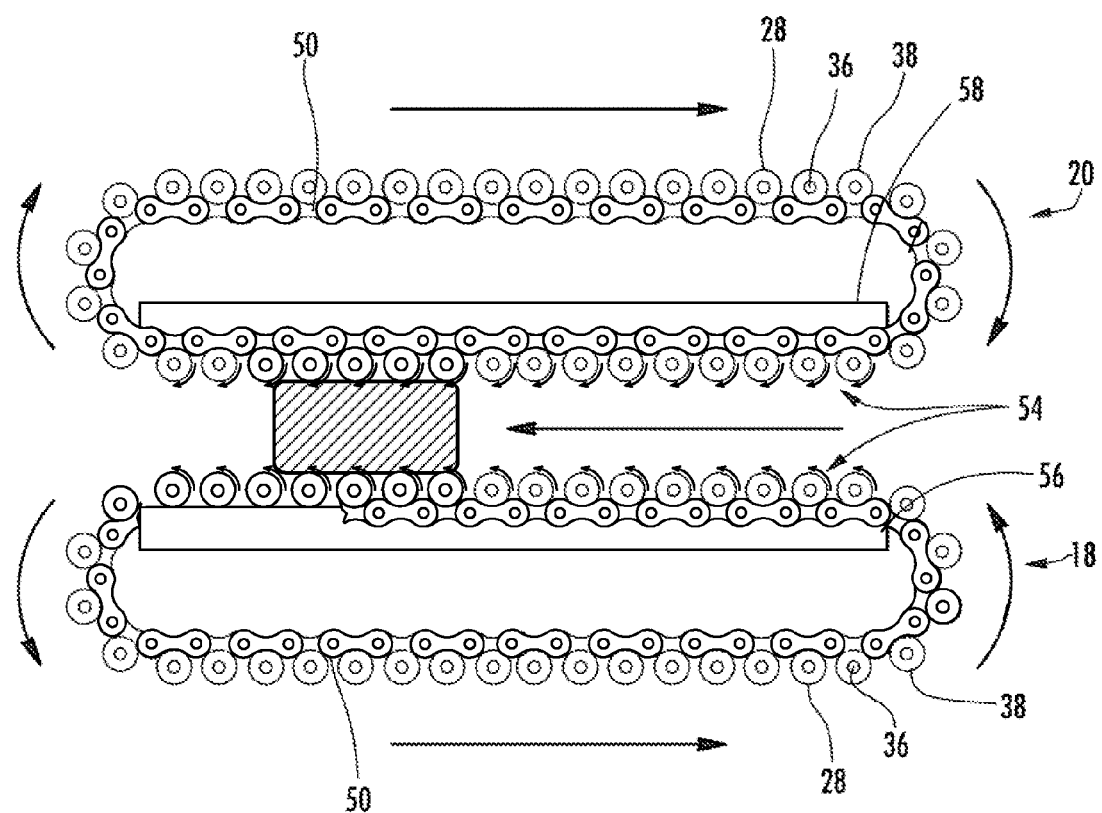

FIGS. 2, 3 and 4 provide a more detailed view of the conveyors 18,20 shown in FIG. 1. Specifically, FIG. 2 is a front perspective view of a portion of the shrink packaging machine of FIG. 1, illustrating the conveyors 18,20 thereof; FIG. 3 is a side perspective view of a portion of the shrink packaging machine of FIG. 1, illustrating the conveyors 18,20 thereof; and FIGS. 4A and 4B are schematic illustrations of the conveyors 18,20 of FIG. 1 highlighting some of the internal components of the conveyors 18,20, with FIG. 4B including a cutaway portion to better illustrate the relationship between rollers 28 and track member 56.

As mentioned above, each of the conveyors 18,20 includes a plurality of parallel rollers 28 disposed in side-by-side relation and interconnected together at the ends thereof to define and form an endless conveyor belt. Each of the conveyors 18,20 also includes a respective drive assembly that is arranged to advance the plurality of rollers 28 collectively in a first direction (i.e., counterclockwise for the rollers 28 in the bottom conveyor 18 and clockwise for the rollers 28 in the top conveyor 20, all as seen from the perspective shown in FIGS. 1-4), and a respective frame 32 that supports the conveyors 18,20. Each frame 32 includes a pair of parallel side panels 34.

In the exemplary apparatus 16 illustrated in FIGS. 1-4, the top conveyor 20 is arranged above the bottom conveyor 18, in opposing facing relation therewith, such that an article 22 to be shrink wrapped may be passed through the opening 24 formed between the bottom conveyor 18 and the top conveyor 20.

As perhaps best seen in FIGS. 4A and 4B, each roller 28 includes a shaft 36 and a coaxial cylindrical member 38 rotationally mounted thereon. Each cylindrical member 38 is covered with a high temperature-resistant non-stick coating, such as silicon rubber or Teflon®. The covering may constitute an application of the material to the roller 28, thereby forming a coating, or, alternatively, the covering may constitute a piece of the material that is adhered, or otherwise attached to, the roller 28. It is preferred that the diameter of each of the rollers 28 be the same. Additionally, it is preferred that the cylindrical member 38 of each roller 28 be generally rigid, whereby a compressible article that is received between the opposed conveyors 18,20 is compressed. In alternative embodiments, however, the cylindrical member 38 of each roller 28 may be resilient and compressible itself.

Each drive assembly may be chain driven. However, the Ordinary Artisan will understand that alternative drive assemblies may be used with the conveyors 18,20. For example, the conveyors 18,20 may be belt driven. As perhaps best seen in FIG. 2, each drive assembly includes a plurality of axles 40 and a plurality of pairs of wheels 42, with each pair of the plurality of wheels 42 being mounted on opposite ends of a corresponding one of the plurality of axles 40 for rotation about an axis thereof. Each drive assembly further comprises a first drive chain 48 supported by and operatively engaged with wheels 42 disposed at first ends 44 of the axles 40 and a second drive chain 50 supported by and operatively engaged with the wheels 42 disposed at second ends 46 of the axles 40. The wheels are adjustable relative to the frame 34 within slots defined in the frame 34 for selective positioning and, in turn, tensioning of the drive chains 48,50. Furthermore, the first drive chain 48 and the second drive chain 50 are synchronously driven in the first direction by a conventional drive mechanism (not shown), which is coupled to the drive assemblies.

The drive chains 48,50 interconnect the rollers 28 of the conveyors 18,20 together. More particularly, ends 60 of the rollers 28 are connected to the drive chains 48,50 thereby holding the rollers 28 in fixed spatial relation to one another. The rollers 28 are attached to the drive chains 48,50 in such a way that each roller 28 may freely rotate about the axis of its respective roller shaft 36. This may be accomplished by supporting ends of the roller shafts 36 via support tabs attached to respective links in the drive chains 48,50. The tabs may comprise washers that are welded to respective links in the drive chains 48,50, through which the roller shafts 36 are received and supported.

The frame side panels 34 are generally rectangular, having opposite longitudinal sides that are relatively longer than opposite lateral ends. The panels 34 support the axles 40 of the drive assembly. More particularly, the opposite ends of the axles 40 are each clamped to the end of a respective adjustment assembly. The adjustment assemblies are, in turn, fastened to the side panels 34, thereby permitting the distance between opposite ends of each roller conveyor 18,20 to be lengthened or shortened as necessary to achieve a desired tension level in the drive chains 48,50. In the present embodiment, each side panel 34 comprises a single section and generally extends in a horizontal direction. It is contemplated that the side panels may include side panel sections interconnected with one another, some of which may extend at an angle relative to horizontal (further described below, for example, with regard to FIG. 7).

As shown in FIGS. 4A and 4B, each conveyor 18,20 has an article surface 54, defined herein as the collective set of surfaces of the rollers 28 that contact the article traveling through the shrink tunnel. A respective track member 56,58 is located adjacent and engages the rollers 28 of a respective conveyor 18,20. Each track member 56,58 may comprise, for example, rails mounted to the shrink packaging machine 10 over which the rollers 28 move. As the chains 48,50 collectively pull the rollers 28 in a forward direction, the rollers 28 are pulled across the track member 58 and, because of frictional abutment of the rollers 28 with the track members 56,58, the rollers 28 are caused to rotate. The track members 56,58 thereby impart rotational motion to each cylinder 38 around its respective shaft axis. That is, with particular reference to FIGS. 4A and 4B, the track member 56 of the bottom conveyor 18 causes each of the rollers 28 of the bottom conveyor 18 to rotate in a counterclockwise direction, while the track member 58 of the top conveyor 20 causes each of the rollers 28 of the top conveyor 20 to rotate in a clockwise direction. As a result of the roller rotation in conveyors 18,20 and the article 22 retained between and in engagement with the rotating rollers 28 at the article surfaces 54, the article 22 is caused to move in a forward direction through the shrink packaging machine 10 at a speed that is greater than the speed at which the portions of the chains 48,50 of the conveyors 18,20 adjacent the article 22 move through the shrink packaging machine 10. Thus, the forward motion of the conveyors 18,20, in combination with rotation of the individual rollers 28, moves the article 22 through the shrink tunnel 14.

Rotation of the rollers 28 further keeps the surfaces of the rollers 28 constantly moving in relation to the shrink film surrounding the article 22, with no portion of the shrink film remaining constantly covered by a surface of a roller 28, thus enabling the shrink film to shrink properly within the hot air chamber of the shrink packaging machine 10.

More specifically, in operation, an article 22 is shrink wrapped by covering the article 22 with shrink film and then conveying the article 22 on the bottom conveyor 18 through the shrink tunnel 14. Some portion of the plurality of rollers 28 in the top conveyor 20 forcibly compresses the article 22, forcing it into constant engagement with at least a portion of the rollers 28 of the bottom conveyor 18, as hot air is blown on the article 22 in the hot air chamber. The plurality of spaced apart rollers 28 of the top and bottom conveyors 20,18 permits the hot air to be blown in between the rollers 28 and around the article 22.

Figure 5:
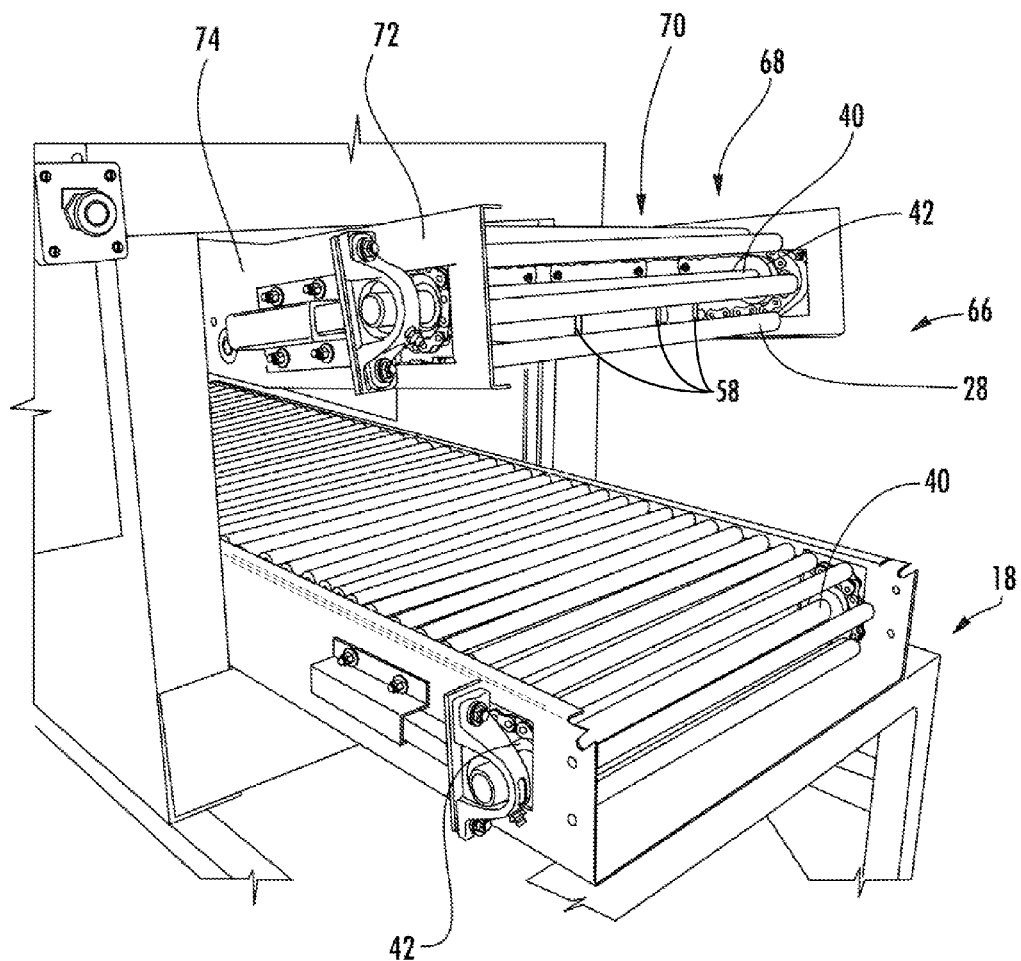
FIG. 5 is a front perspective view of a portion of a shrink packaging machine, including a pair of conveyors, in accordance with a second preferred embodiment of the present invention.
Figure 6:
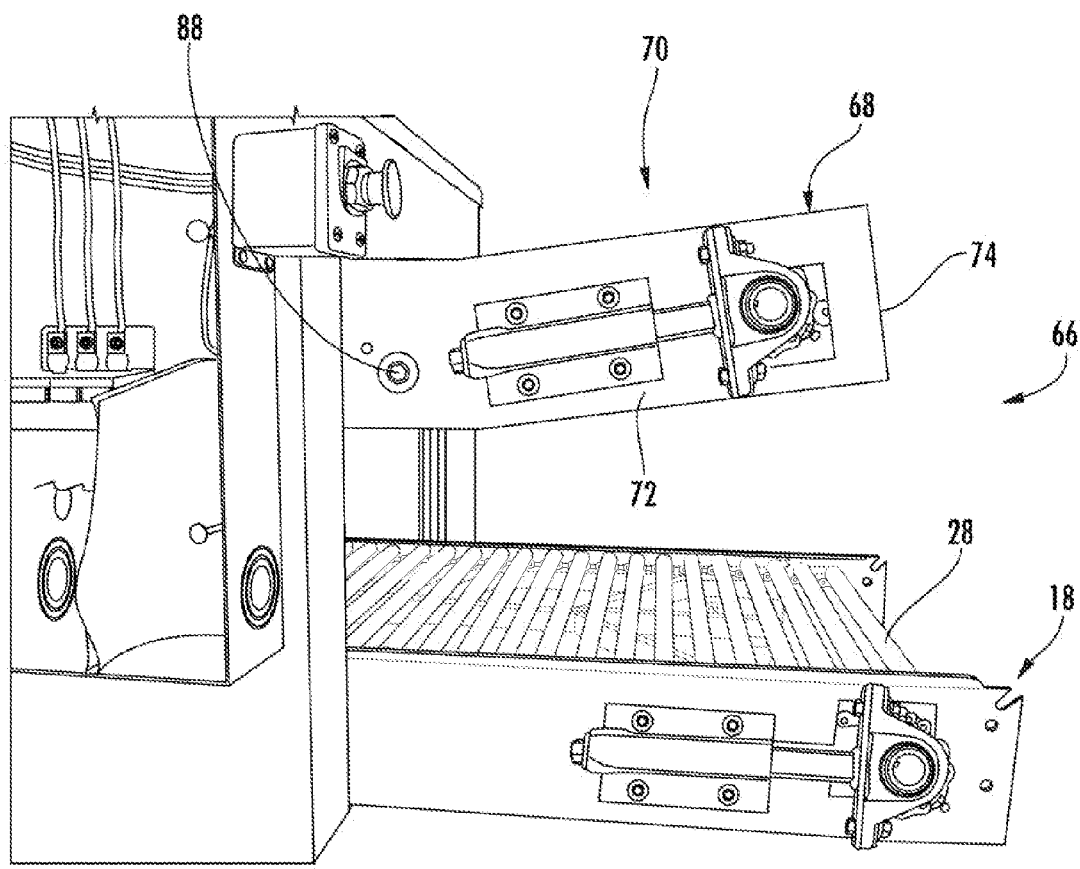
FIG. 6 is a side perspective view of a portion of the shrink packaging machine of FIG. 5, further illustrating the conveyors thereof.

FIGS. 5 and 6 show a second embodiment of the present invention, wherein the top conveyor 68 is oriented at an angle relative to horizontal. More particularly, FIG. 5 is a front perspective view of a portion of a shrink packaging machine, including a pair of conveyors 18,68, in accordance with a second preferred embodiment of the present invention. FIG. 6 is a side perspective view a portion of the shrink packaging machine of FIG. 5, further illustrating the conveyors thereof.

In the second embodiment, an inlet or infeed portion 70 of the top conveyor 68 is oriented at an angle relative to horizontal, thereby creating a funneling effect. To enable this funneling effect of the top conveyor 68, an inlet section 72 of the side panels 74 of the top conveyor 68 are angled relative to horizontal. As in the first embodiment, the side panels 74 are secured by fasteners 88, and the rollers 28 of the top conveyor 68 follow the path created by the side panels 74. The bottom conveyor 18 of the second embodiment may be the same as that of the first embodiment. Furthermore, the drive assembly of the top conveyor 68 operates in the same manner in the second embodiment as it does in the first embodiment.

Figure 7:
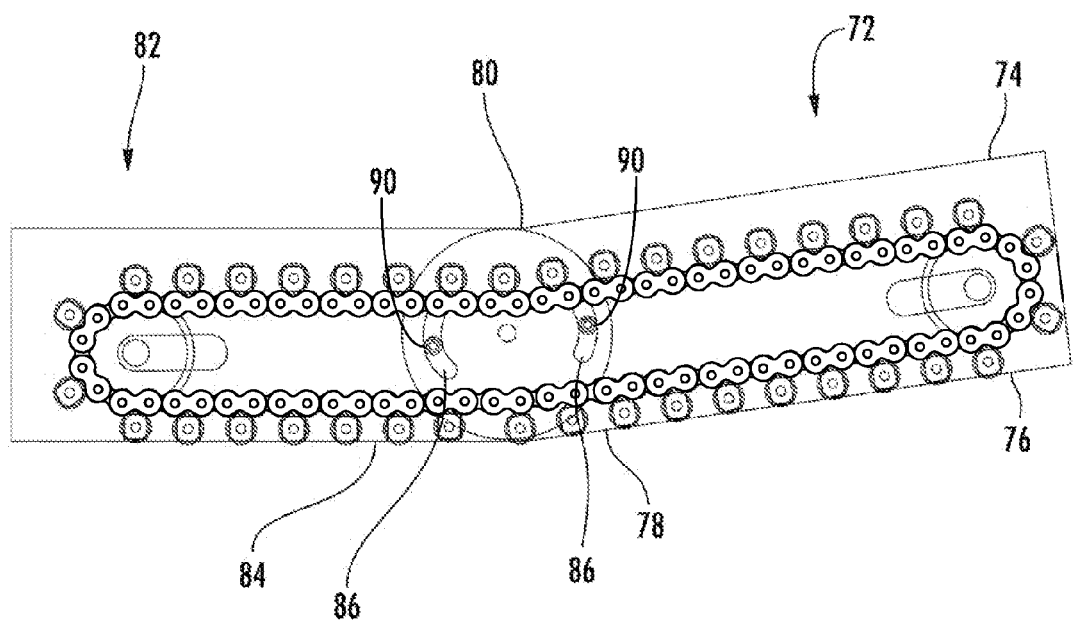
FIG. 7 is a schematic illustration of a top conveyor of FIG. 5.

FIG. 7 is a schematic illustration of a top conveyor 68 of the second embodiment of the present invention. Inlet sections 72 of the side panels 74 of the top conveyor 68 each have a distal end 76 and proximal end 78. For each panel 74, the proximal end 78 of the inlet section 72 forms a joint 80 with a distal end 84 of a second section 82 of the side panel 74. Although the joint 80 may be fixed, the joint 80 preferably permits the angle of orientation of the inlet section 72, relative to horizontal, to be adjusted. As such, the joint forms an infeed pivot axis.

For example, as shown in FIG. 7, a pair of curved slots 86 may be disposed at the joint 80 between the inlet section 72 and the second section 82. The slots 86 are arranged on generally opposite sides from one another such that their length extends generally vertically. In addition, the slots 86 curve toward one another. A fastener 90 is inserted through each of the slots 86. The fasteners 90 hold the inlet sections 72 of the panels 74 in place at the angular orientations at which they have been set. When it is desired to change the angle of the inlet section 72, a user simply loosens the fasteners 90, adjusts the inlet sections 72 to the desired angle, and then retightens the fasteners 90. When angled as described and illustrated, this arrangement creates a graduated or tapered entry into the shrink tunnel 14 of the shrink packaging machine 10 wherein the opposed conveyors 18,76 (and more specifically, sections thereof) are generally disposed in a converging orientation relative to one another. The funneling effect provided by this convergence permits an article having an uncompressed height that is more than the height allowance of the shrink tunnel to be initially compressed for fitting through the shrink tunnel.

Figure 8:
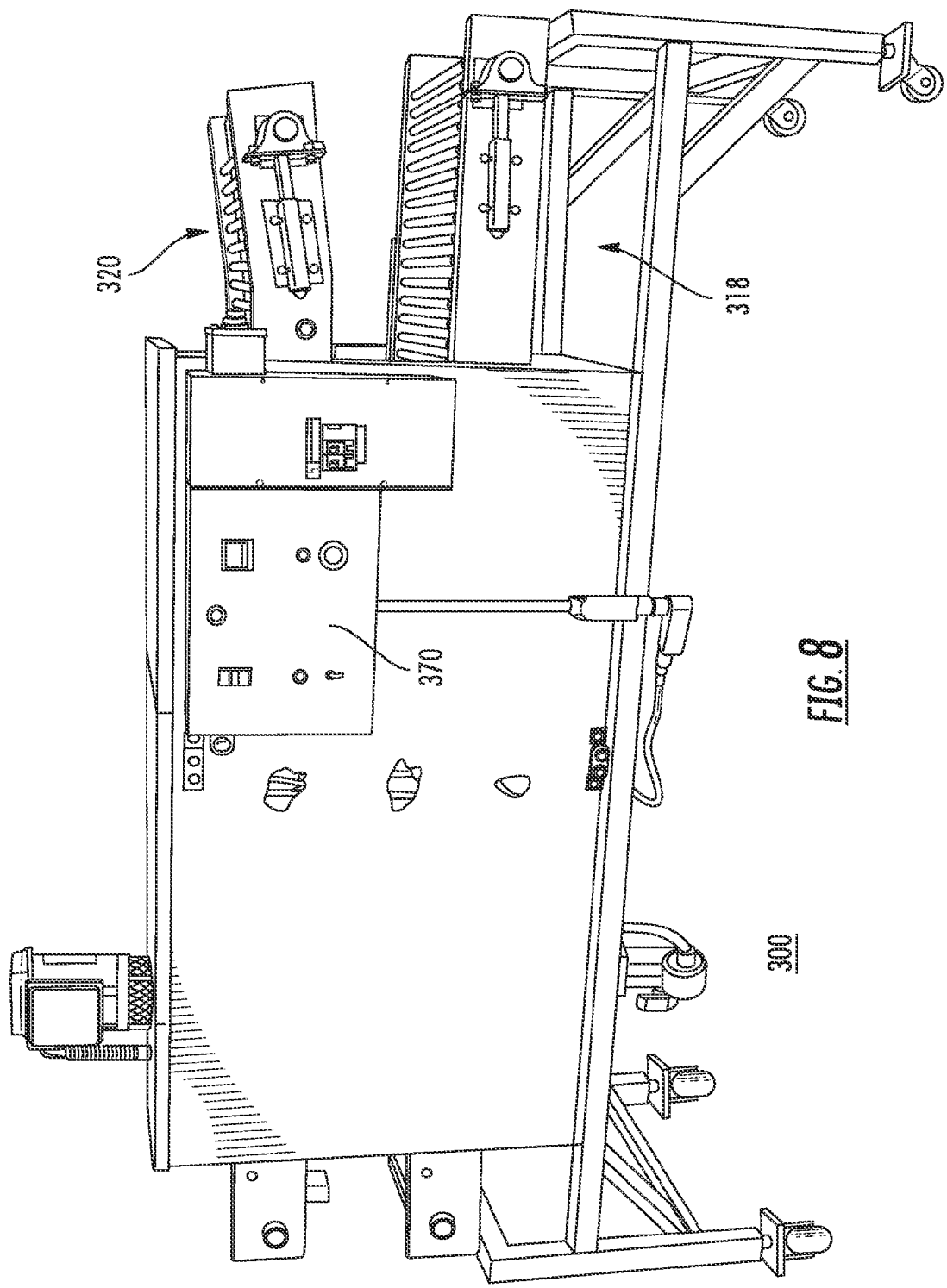
FIG. 8 is a perspective view of a first side of a shrink packaging machine including a pair of conveyors in accordance with a third preferred embodiment of the present invention.
Figure 9:
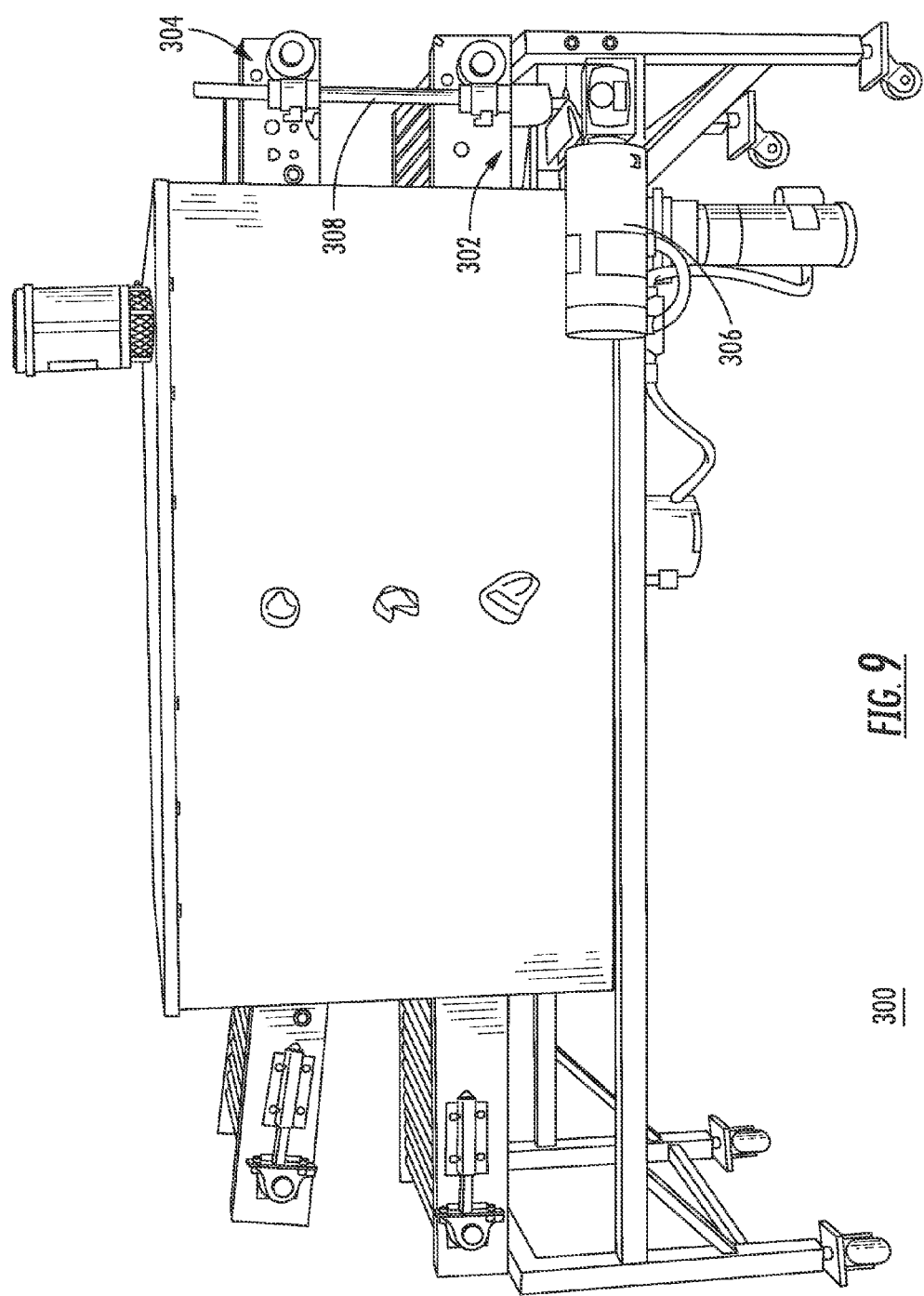
FIG. 9 is a perspective view of the other side of the shrink packaging machine of FIG. 8.
Figure 10:
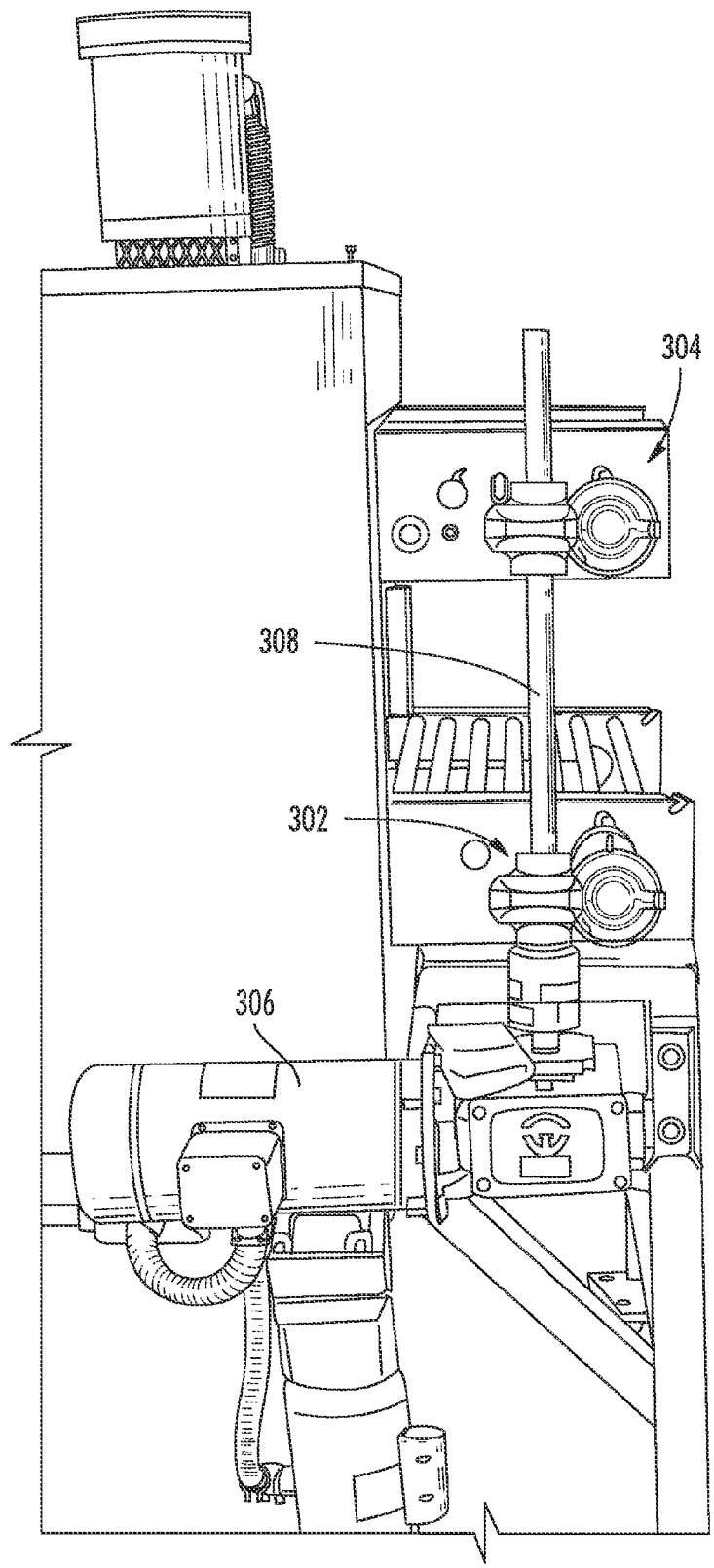
FIG. 10 is a partial perspective view of a portion of the side of the shrink packaging machine of FIG. 8 showing a drive mechanism for synchronously driving the first and second drive assemblies driving of the shrink packaging machine.
Figure 11:
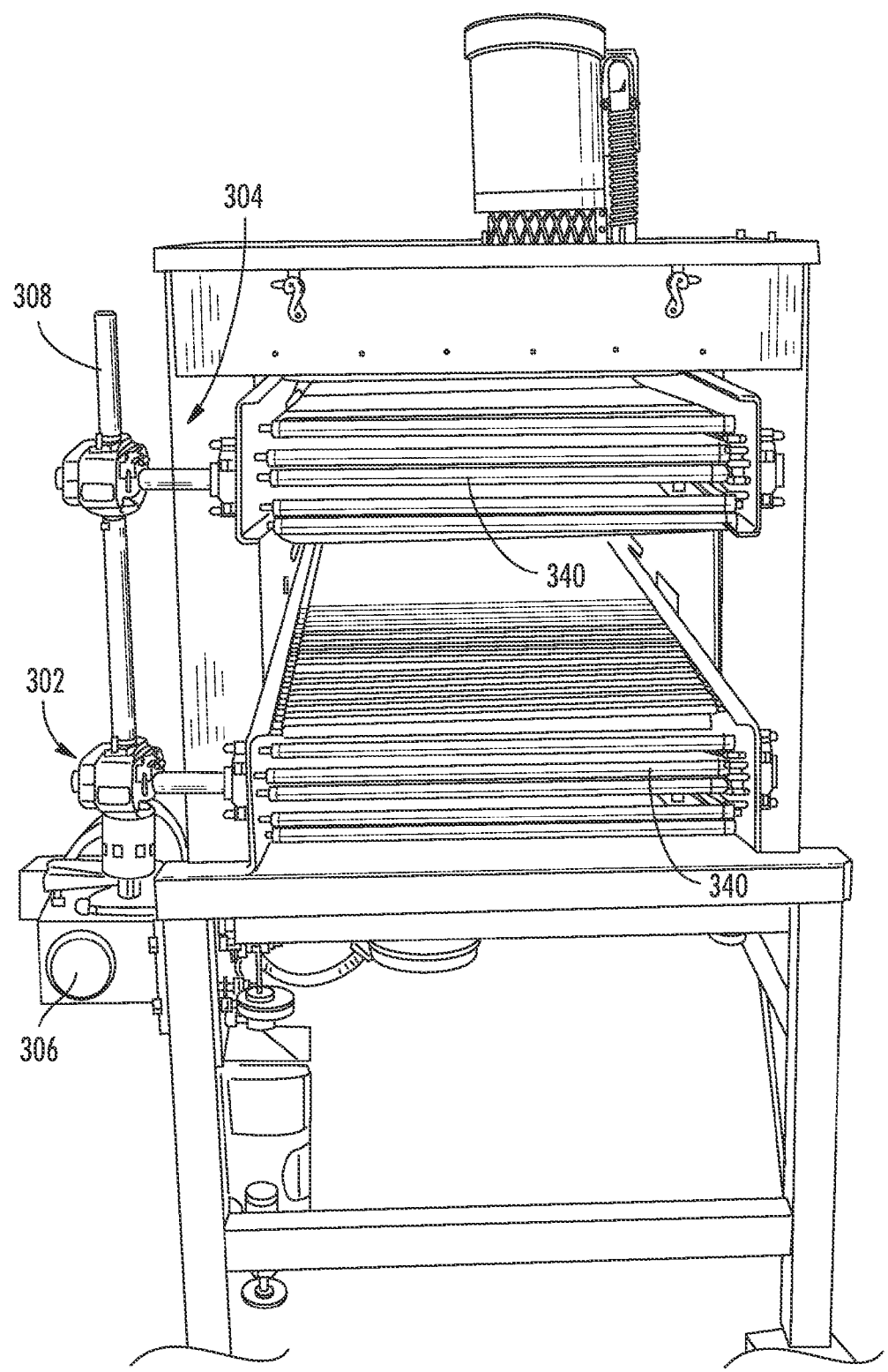
FIG. 11 is a perspective view of an end of the shrink packaging machine of FIG. 8.
Figure 12:
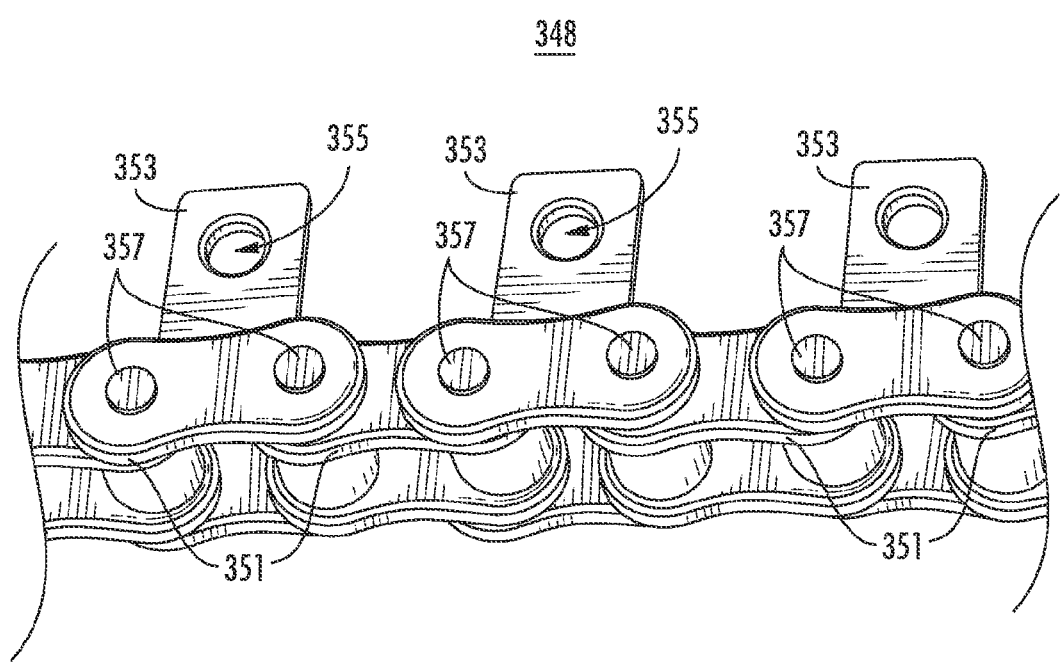
FIG. 12 is a portion of a drive chain of the shrink packaging machine of FIG. 8.

Still yet, a third embodiment of a shrink packaging machine 300 in accordance with the present invention is illustrated in FIGS. 8-11, and a portion of a drive chain 348 thereof is illustrated in FIG. 12. Specifically, FIG. 8 is a perspective view of a first side of the shrink packaging machine 300; FIG. 9 is a perspective view of the other side of the shrink packaging machine 300; FIG. 10 is a partial perspective view of a portion of the side of the shrink packaging machine 300; and FIG. 11 is a perspective view of an end of the shrink packaging machine 300.

The shrink packaging machine 300 is similar in design to the first and second embodiments described above. For example, the shrink packaging machine 300 includes a pair of conveyors 318,320 and a drive mechanism for synchronously driving first and second drive assemblies, as in the first and second embodiments. The drive mechanism includes a motor 306 and a common drive shaft 308 that is driven by the motor and that is operatively coupled both to the drive assembly of the first conveyor 318 at 302 and to the drive assembly of the second conveyor 320 at 304. In particular, the drive shaft 308 drives each of the axels 340 and the axels 340 are operatively coupled via wheels to the drive chains.

An exemplary drive chain 348 of the shrink packaging machine 300 on which the rollers are carried is shown in FIG. 12. As shown in FIG. 12, each link 351 of the drive chain 348 is pivotally attached— and interconnected to other links 351— by a tab 353 that defines an opening 355 for receiving and supporting a shaft of a roller. In this respect, each tab 353 is generally T-shaped and defines a pair of openings through which pins 357 pivotably connect each tab 353 to a pair of links 351.

The shrink packaging machine 300 further preferably is capable of selective adjustment of the spacing between the opposing conveyors 318,320 for further compression of articles that are conveyed through the hot air chamber of the machine 300. A control panel 370 preferably includes up and down buttons for increasing and decreasing the spacing between the opposing conveyors 318,320, which preferably is accomplished using a motor or other mechanical means. Moreover, as the spacing between the conveyors 318,320 is changed, the points of coupling 302,304 along the drive shaft 308. Preferably, a height of the lower conveyor 318 remains fixed and the height of the upper conveyor 320 is selectively adjustable for varying the spacing between the conveyors 318,310. This additional ability to vary the spacing between the conveyors 318,320 enables the article to be compressed to various states of compression, as desired. The compression further may be performed while the article is conveyed through the hot air chamber of the shrink packaging machine via conveyors 318,320.

A shrink packaging machine including an apparatus of one or more embodiments of the present invention effectively provides both compression and shrink packaging to compressible articles. As an article travels through the shrink tunnel, hot air from the hot air chamber is able to travel between the rollers of the conveyors to shrink the film surrounding the article. In addition, because no part of the surface of the conveyors remains in contact with the shrink film for more than a very short time, the film is able to continuously move as it shrinks despite the compressive forces of the conveyors against the article.

Accordingly, a shrink packaging machine having the apparatus of the present invention provides an advantage over conventional shrink packaging machines as described hereinabove. The advantages are believed to result in a shrink wrapped product that is suitable for display and purchase at retail outlets by consumers. Consequently, by using the present invention, it is believed that the need to shrink wrap a product already packaged for retail sale will be reduced if not completely alleviated. Indeed, it is believed that compressible articles such as sweatshirts, blankets, pillows, and bedspreads may be packaged for distribution and sale using the present invention without having to remove the shrink wrapping after the product arrives at the final destination for retail sale. The present invention thus is believed to alleviate not only the costs associated with the labor of removing the shrink wrapping but also the costs associated with having to package the article prior to shrink wrapping.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method for conveying an article within a hot air chamber of a shrink packaging machine, comprising both:
    (a) carrying an article on an endless conveyor that is driven in a direction of travel of the article through a hot air chamber of the shrink packaging machine, the conveyor comprising a plurality of parallel rollers disposed in side-by-side relation and interconnected together at the ends thereof, the article being engaged by the surfaces of the rollers of the conveyor; and
    (b) concurrently rotating the rollers of the conveyor having surfaces in engagement with the article such that the article is further propelled in the direction of travel of the article through the hot air chamber of the shrink packaging machine, the article thereby being conveyed through the shrink packaging machine at a speed greater than a speed of the conveyor in the direction of travel of the article through the hot air chamber of the shrink packaging machine; and
    (c) compressing the article while conveying the article through the shrink packaging machine;
    (d) wherein, during carrying of the article through the hot air chamber, a roller of the plurality of parallel rollers simultaneously contacts both the article and a track.

2. The method of claim 1, further comprising compressing the article during infeeding of the article into the shrink packaging machine.

3. The method of claim 1, wherein said step of compressing comprises compressing the article between the conveyor and a second conveyor arranged in opposing spaced relation thereto, the second conveyor comprising a plurality of parallel rollers disposed in side-by-side relation and interconnected together at the ends thereof, the article being engaged by the surfaces of the rollers of the second conveyor.

4. A method for conveying an article through a shrink packaging machine, comprising both:
    (a) transporting an article within the shrink packaging machine by,
        (i) engaging an article by and between two opposed conveyors, and
        (ii) driving the opposed conveyors at approximately the same speed in a common direction through a shrink packaging machine, each of the two conveyors comprising a plurality of parallel rollers disposed in side-by-side relation and interconnected together at the ends thereof, the article being engaged by surfaces of particular rollers of the two conveyors; and
    (b) concurrently causing to rotate the particular rollers having surfaces in engagement with the article such that the article is propelled relative to the particular rollers, whereby the article is transported within the shrink packaging machine at a different speed than the speed of the rollers of the opposed conveyors, and whereby rotation of the particular rollers keeps the surfaces of the particular rollers constantly moving in relation to shrink film of the article.

5. The method of claim 4, wherein the article is further propelled by rotation of the particular rollers in the common direction through the shrink packaging machine, the article thereby being conveyed through the shrink packaging machine at a speed greater than the common speed of the two conveyors.

6. The method of claim 4, wherein the step of causing the rollers having surfaces in engagement with the article to rotate comprises retaining the rollers of the conveyors in abutment with track members extending within and mounted in fixed disposition to the shrink packaging machine such that the driving of the conveyors results in the rolling of the rollers on the track members.

7. The method of claim 4, wherein the article comprises a shrink wrap film and wherein the rollers of each conveyor are disposed at predetermined distances relative to each other so as to provide openings through which the film is exposed to hot air within the shrink packaging machine for shrinking of the film.

8. The method of claim 4, wherein the article is compressible and further comprising compressing the compressible article between the opposed conveyors.

9. The method of claim 8, wherein the step of compressing the article between the opposed conveyors includes disposing a leading section of the opposed conveyors in a converging orientation relative to one another and a second section and a trailing section of the opposed conveyors in parallel orientation relative to one another, whereby the compressible article is compressed during conveyance through the leading section of the opposed conveyors and is held in a compressed state during conveyance through the trailing section of the opposed conveyors.

10. The method of claim 4, wherein driving the opposed conveyors comprises driving the opposed conveyors with the same drive mechanism.

11. The method of claim 4, further comprising varying a spacing between the opposed conveyors for changing the state of compression of the article.

12. An apparatus for conveying an article through a hot air chamber of a shrink packaging machine, comprising:
    (a) a first conveyor including,
        (i) a first plurality of rollers, each roller thereof including a shaft and a cylindrical member mounted on said shaft for rotation about an axis of said shaft, said rollers of said first plurality being interconnected together to form a first endless conveyor belt,
        (ii) a first drive assembly for advancing the first endless conveyor belt in a first direction within a hot air chamber of a shrink packaging machine, and
        (iii) a first track member extending within the hot air chamber of the shrink packaging machine and having a surface disposed in engagement with particular rollers of the first endless conveyor belt located within the hot air chamber of the shrink packaging machine, wherein each of the particular rollers of the first endless conveyor belt rolls over the surface of the first track member when advanced through the hot air chamber of the shrink packaging machine by the first drive assembly; and (b) a second conveyor including,
   (i) a second plurality of rollers, each roller thereof including a shaft and a cylindrical member mounted on said shaft for rotation about an axis of said shaft, said rollers of said second plurality being interconnected together to form a second endless conveyor belt,
   (ii) a second drive assembly for advancing the second endless conveyor belt in the first direction within the hot air chamber of the shrink packaging machine, and
   (iii) a second track member extending within the hot air chamber of the shrink packaging machine and having a surface disposed in engagement with particular rollers of the second endless conveyor belt located within the hot air chamber of the shrink packaging machine, wherein each of the particular rollers of the second endless conveyor belt rolls over the surface of the second track member when advanced through the hot air chamber of the shrink packaging machine by the second drive assembly;
(c) wherein the first conveyor is located over the second conveyor in opposing facing relation therewith such that a compressible item to be shrink wrapped may be compressed and conveyed through the hot air chamber of the shrink packaging machine between and by the first and second conveyors;
(d) means for causing the compressible item to be conveyed through the hot air chamber at a different velocity than the rollers of each plurality of rollers.

13. The apparatus of claim 12, wherein the first drive assembly and the second drive assembly include a common drive mechanism for advancing the first and second endless conveyor belts in the first direction within the hot air chamber of the shrink packaging machine.

14. The apparatus of claim 12, wherein the first drive assembly comprises a first pair of drive chains, and wherein the second drive assembly comprises a second pair of drive chains.

15. The apparatus of claim 14, wherein each respective roller of the first plurality of rollers is attached to a different link in each of the first pair of drive chains, and wherein each respective roller of the second plurality of rollers is attached to a different link in each of the second pair of drive chains.

16. The apparatus of claim 12, wherein the first track member comprises one or more rails mounted to the shrink packaging machine and extending within the hot air chamber of the shrink packaging machine, and wherein the second track member comprises one or more rails mounted to the shrink packaging machine and extending within the hot air chamber of the shrink packaging machine.

17. The apparatus of claim 12, wherein the product of the respective angular velocity and the respective diameter of each roller of both the particular rollers of the first endless conveyor belt and the particular rollers of the second endless conveyor belt is the same.

18. The apparatus of claim 17, wherein the diameter of each roller of both the first endless conveyor belt and the second endless conveyor belt is the same.

19. The apparatus of claim 12, further comprising a first pair of side support frames disposed on opposite sides of the first endless conveyor belt and supporting the first endless conveyor belt therebetween, each of the first pair of side support frames including first and second sections connected together for selective disposition relative to each other about an infeed pivot axis whereby an angle of infeed may be selectively adjusted for accommodating compressible articles having different heights by the shrink packaging machine.

20. The apparatus of claim 12, wherein the first and second conveyors are arranged such that a spacing between the first conveyor and the second conveyor is selectively adjustable for varying a state of compression of the article.

\* \* \* \* \*